(12) United States Patent
Lee

(10) Patent No.: US 9,306,625 B2
(45) Date of Patent: Apr. 5, 2016

(54) SYSTEMS AND METHODS FOR BROADBAND OVER POWER LINE MULTIPLE INTERFACE DEVICES AND SYSTEMS

(71) Applicant: The Boeing Company, Seal Beach, CA (US)

(72) Inventor: Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 13/937,686

(22) Filed: Jul. 9, 2013

(65) Prior Publication Data

US 2015/0016271 A1 Jan. 15, 2015

(51) Int. Cl.
H04B 3/56 (2006.01)

(52) U.S. Cl.
CPC ............ *H04B 3/56* (2013.01); *H04B 2203/542* (2013.01)

(58) Field of Classification Search
CPC ................. H04J 1/00; H04J 1/02; H04J 3/00; H04B 1/00; H04B 1/02; H04B 3/00; H04B 3/54
See application file for complete search history.

(56) References Cited

U.S. PATENT DOCUMENTS

| 5,954,810 | A | 9/1999 | Toillon et al. | |
|---|---|---|---|---|
| 6,995,658 | B2 | 2/2006 | Tustison et al. | |
| 7,893,557 | B2 * | 2/2011 | Davis et al. | 307/9.1 |
| 2003/0018840 | A1 | 1/2003 | Chandler et al. | |
| 2005/0131922 | A1 | 6/2005 | Kennedy et al. | |
| 2008/0217996 | A1 | 9/2008 | Niss | |
| 2008/0300750 | A1 * | 12/2008 | Davis et al. | 701/36 |
| 2009/0228223 | A1 | 9/2009 | Liu et al. | |
| 2010/0096919 | A1 | 4/2010 | Meckes et al. | |
| 2011/0064009 | A1 * | 3/2011 | Shi et al. | 370/295 |
| 2012/0099627 | A1 | 4/2012 | Mitchell et al. | |
| 2013/0003756 | A1 | 1/2013 | Mitchell et al. | |
| 2014/0049099 | A1 * | 2/2014 | Sampigethaya et al. | 307/1 |

FOREIGN PATENT DOCUMENTS

EP 0 029 705 A1 6/1981

OTHER PUBLICATIONS

European Search Report issued in European Application No. GB 1408462.8 mailed Oct. 9, 2014.
"Multi-Protocol Converter Interface Unit," Avalon Scientific, Inc., 6 pages.
U.S. Appl. No. 13/606,119, filed Sep. 7, 2012.
U.S. Appl. No. 13/587,647, filed Aug. 16, 2012.
U.S. Appl. No. 13/769,684, filed Feb. 18, 2013.
U.S. Appl. No. 13/866,397, filed Apr. 19, 2013.
U.S. Appl. No. 13/866,348, filed Apr. 19, 2013.
U.S. Appl. No. 13/786,310, filed Mar. 5, 2013.

\* cited by examiner

*Primary Examiner* — Anh Ngoc Nguyen
(74) *Attorney, Agent, or Firm* — Armstrong Teasdale LLP

(57) ABSTRACT

An aircraft systems interface unit includes a multiplexer and a broadband over power line (BPL) modem. The multiplexer includes a plurality of inputs and an output for outputting data received through the plurality of inputs. Each input is configured for connection to at least one aircraft data bus. The BPL modem is coupled to the output of the multiplexer and configured to transmit data received from the multiplexer over a power line.

20 Claims, 6 Drawing Sheets

SYSTEMS AND METHODS FOR BROADBAND OVER POWER LINE MULTIPLE INTERFACE DEVICES AND SYSTEMS

BACKGROUND

The present disclosure relates generally to transmitting data, and more particularly to interfacing with multiple data buses and transmitting data between multiple aircraft data buses of between an aircraft and a ground station.

Modern aircraft typically include a large number of electronic systems and devices communicating one numerous data buses. Functional testing, data bus monitoring, and sensor simulation for an aircraft typically requires a large umbilical cable consisting of many wires extending from the aircraft to testing, monitoring, and/or maintenance equipment located outside the aircraft. The umbilical cable may include two or more wires for each bus interface that will be connected to the cable. Moreover, bus repeaters and/or isolators are sometime needed for one or more of the buses under test to compensate for long wire lengths.

BRIEF DESCRIPTION

In one aspect, an aircraft systems interface unit includes a multiplexer and a broadband over power line (BPL) modem. The multiplexer includes a plurality of inputs, each configured for connection to at least one aircraft data bus, and an output for outputting data received through the plurality of inputs. The BPL modem is coupled to the output of the multiplexer. The BPL modem is configured to transmit data received from the multiplexer over a power line.

In another aspect, an aircraft bus extension system includes a first aircraft systems interface unit and a second aircraft systems interface unit. The first aircraft systems interface unit includes a multiplexer and a broadband over power line (BPL) modem. The multiplexer is configured to receive data from a plurality of aircraft data buses through a plurality of interfaces and output the received data through an output. The BPL modem is coupled to the output of the multiplexer. The BPL modem is configured to convert data received from the multiplexer to Ethernet packets and transmit the Ethernet packets over a power line. The second aircraft systems interface unit includes a BPL modem configured to be coupled to a power line to receive Ethernet packets transmitted over the power line by said first aircraft systems interface unit. The BPL modem is configured to convert received Ethernet packets to the format in which the data was received by the first aircraft systems interface unit and output the data.

In another aspect, a method of extending an aircraft bus is described. The method includes receiving, at a first location, data from a plurality of aircraft data busses, multiplexing the received data, encoding the multiplexed data into Ethernet packets, transmitting the Ethernet packets over a power line, receiving, at a second location connected to the power line, the Ethernet packets, and decoding the multiplexed data from the Ethernet packets.

DETAILED DESCRIPTION

Figure 1:
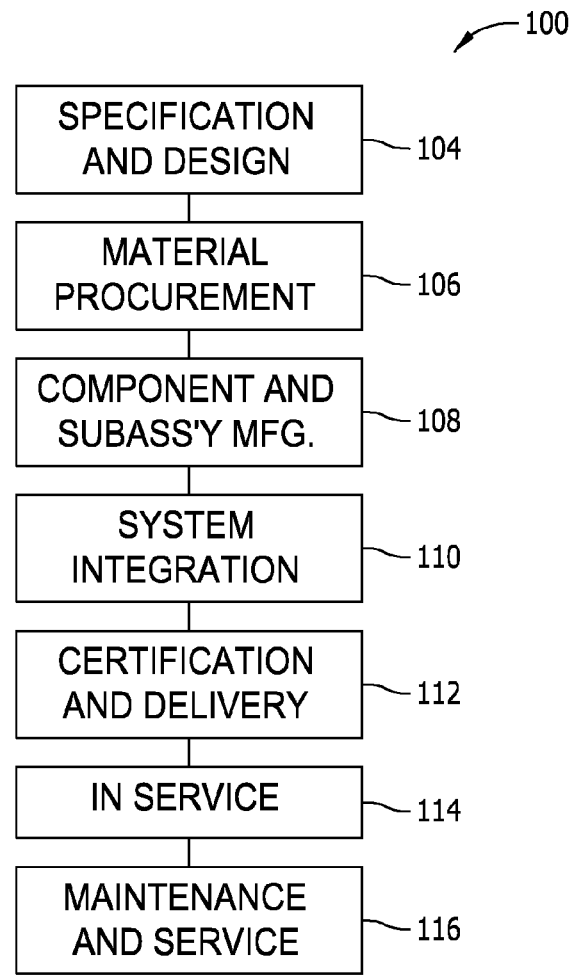
FIG. 1 is a flow diagram of an exemplary aircraft production and service methodology.
Figure 2:
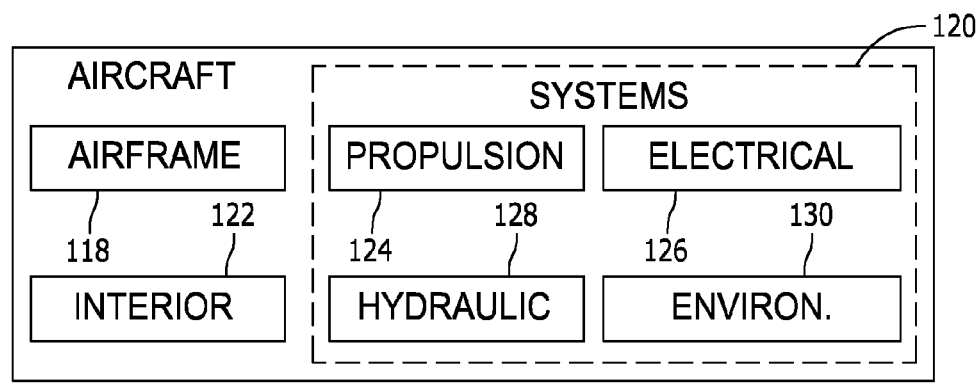
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
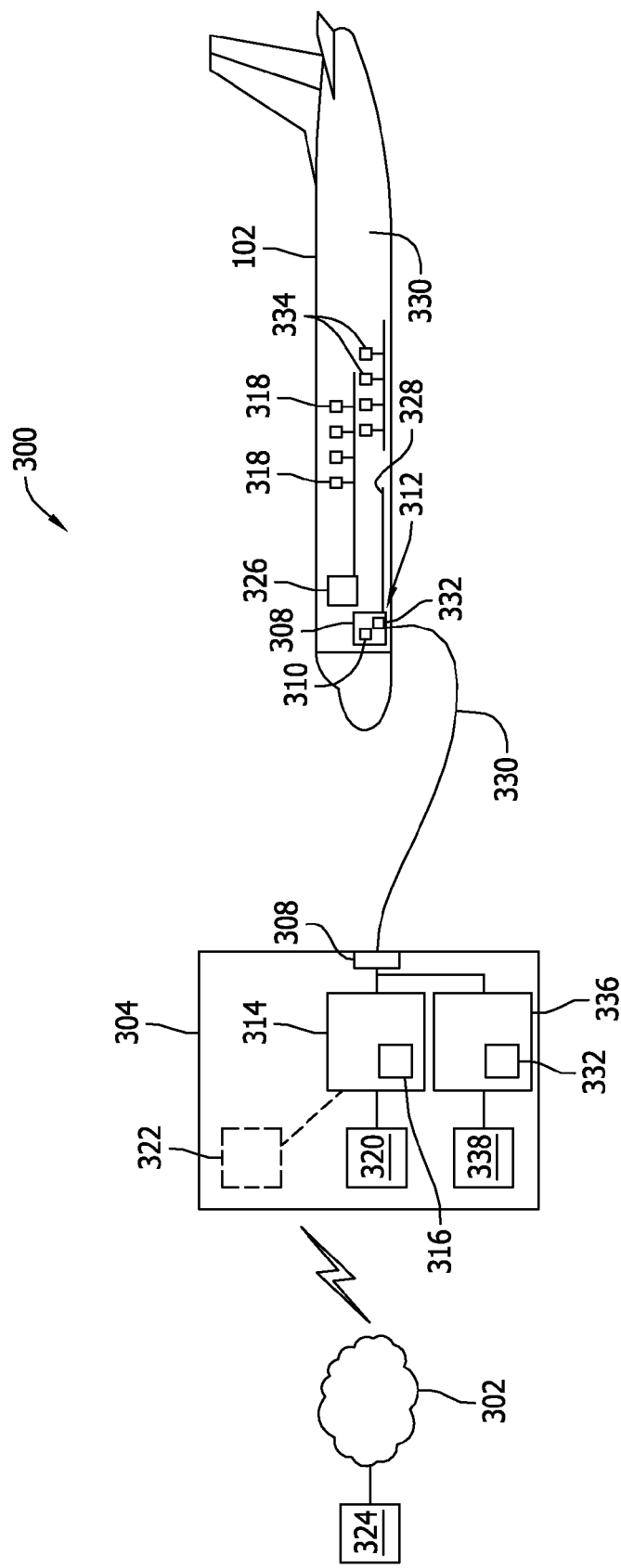
FIG. 3 is a diagram of an exemplary system 300 for use in extending an aircraft network and/or data bus.

FIG. 3 is a diagram of an exemplary system 300 for use in extending an aircraft network and/or data bus. In the exemplary implementation, system 300 works with an aircraft 102 on the ground at an airport, factory, maintenance facility, etc. (not shown) As used herein the term "airport" refers to any location in which aircraft, such as fixed-wing aircraft, helicopters, and/or blimps, take off and land. System 300 includes a power system 304 that supplies power to aircraft 102. In the exemplary implementation, power system 304 is a ground-based power cart, i.e., a ground power unit, that is mobile and that selectively supplies power to an aircraft parked on the ground at locations at, or adjacent to, the airport. In one implementation, power system 304 may be a conventional power delivery system used at least some known airports. Power system 304 is coupled to aircraft 102 when aircraft 102 is parked at the airport. An electrical cable 306, e.g., a power stinger cable, couples aircraft 102 to power system 304 via at least one stinger connector 308. In one implementation, power system 304 provides 400 Hz power to the aircraft via the electric cable 306. However in alternative implementations, any suitable power for a particular type of aircraft or vehicle may be provided via electric cable 306.

In the exemplary implementation, aircraft 102 includes an on-board BPL modem 310, or on-board BPL module 310, that enables communication via electrical cable 306. More particularly, in the exemplary implementation, on-board BPL modem 310 is coupled to stinger connector 308 to form an integrated BPL modem cover assembly 312 for stinger connector 308. BPL modem 310 is capable of communicating with an off-board BPL modem 314, or off-board BPL module 314, included in power system 304. In the exemplary implementation, BPL modem 310 is communicatively coupled to on-board networks 318. On-board networks 318, such as, but not limited to, in-flight entertainment systems, avionics systems, flight control systems, flight bag(s), and/or cabin systems.

In the exemplary implementation, power system 304 includes off-board BPL modem 314 coupled to an inductive coupler 316. Inductive coupler 316 couples BPL modem 314 to electrical cable 306. Inductive coupler 316 also transfers communications signals onto electrical cable 306. Power system 304 also includes a computing device 322 that can communicate directly with aircraft 102 to transfer data to networks 318. In the exemplary implementation, modem 314 is also coupled to a transceiver 320 that is communicatively coupled to ground-based network 302. For example, in one implementation, transceiver 320 is a wireless transceiver that transmits data to/from network 302. Transceiver 320 may be wirelessly coupled to network 302 or physically coupled to network 302 through a wired connection. It should be noted that transceiver 320 may communicate with network 302 using any protocol that enables broadband communication as described herein.

In the exemplary implementation, aircraft 102 receives electrical power from power system 304 via electrical cable 306 and sends/receives data communications to/from ground-based network 302 via cable 306. Moreover, in the exemplary implementation, aircraft 102 communicates via on-board BPL modem 310 using TCP/IP, however any other suitable protocol can be used. In one implementation, encryption is employed to further secure communications between aircraft 102 and ground-based network 302 and/or computing device 322. Received power is distributed to a power bus 328.

Ground-based network 302 may be communicatively coupled to a server 324 that may be operated by the airline or entity that operates aircraft 102. Alternatively, server 324 may be operated by a third-party, such as the airport, an aircraft manufacturer, and/or an aircraft service provider. For example, server 324 may be coupled to ground-based network 302 via a LAN, a WAN, and/or the Internet. Server 324 may transmit data to and receive data from aircraft 102. For example, server 324 may provide software and/or firmware updates to components of aircraft 102, such as cabin systems software, flight bag, and avionics software. Server 324 may also provide content, such as music, movies, and/or internet data such as cached web content for in-flight entertainment systems on aircraft 102. In one implementation, system 300 is used to transfer data between aircraft 102 and ground-based network 302 during a quick-turn of aircraft 102. As used herein, a quick-turn is a quick turn-around time (i.e., less than about 30 minutes) of an aircraft at a gate between passenger deplaning and boarding. During a quick-turn, content of server 324 may be refreshed and data stored an on-board server 326 during a flight may be transmitted to ground-based network 302.

Although FIG. 3 illustrates power system 304 as being coupled to electrical cable 306 via off-board BPL modem 314, it should be appreciated that other configurations that enable off-board BPL modem 314 to function as described herein are possible. For example, off-board BPL modem 314 may communicate wirelessly with modem 310 when aircraft 102 is directly coupled to power system 304 via electrical cable 306. As another example, off-board BPL modem 314 may be configured to communicate wirelessly with the aircraft via computing device 322 while at the same time, communicate via electrical cable 306 when power is supplied from power system 304 to the aircraft 102.

In the exemplary implementation, aircraft 102 includes an aircraft systems interface unit 332 that enables communication via electrical cable 306. In the illustrated implementation, aircraft systems interface unit 332 is coupled to the stinger connector 308 along with the BPL modem 310. In other implementations, aircraft systems interface unit 332 is coupled to a separate stinger connector 308 from BPL modem 310. Still other implementations may include aircraft systems interface unit 332 without including BPL modem 310. Aircraft systems interface unit 332 BPL is communicatively coupled to a plurality of aircraft data buses 334. Data buses 334 include any data buses carrying information on aircraft 102, and may include on-board networks 318.

Aircraft systems interface unit 332 is connected to multiple data buses 334 to receive data from the data buses 334. Aircraft systems interface unit 332 asynchronously multiplexes the received data and converts the received data to Ethernet packets for transmission over electrical cable 306 to ground based unit 304. Ground based unit 304 includes a ground side interface 336. In the exemplary implementation, ground side interface 336 includes a ground side aircraft systems interface unit 332. In other implementations, ground side interface 336 includes a ground side aircraft systems interface unit which is different than aircraft systems interface unit 332. Ground side interface 336 receives the Ethernet packets sent by aircraft systems interface unit 332 and decodes the data to its original format. Although ground side interface 336 is illustrated within ground based unit 304, in other implementations it is separate from ground based unit 304. Moreover, the connection between aircraft systems interface unit 332 and ground side interface 336 may be made with a cable, such as cable 306, that is not used to provide power to aircraft 102 (although it may be still be a power cable capable of such delivery of power). Although data is described as being transmitted from aircraft systems interface unit 332 to ground side interface 336, it should be understood that data may be transmitted in both directions (i.e., data may be packetized and transmitted from ground side interface 336 to aircraft systems interface unit 332).

Ground side interface 336 outputs the unpacked data to a secondary system 338. In the exemplary implementation, secondary system is a functional test unit (FTU). The FTU includes multiple devices for testing aircraft systems, monitoring aircraft systems, providing sensor simulation, etc. In other implementations, secondary system 338 may be a computing device configured to receive the data from ground side interface 336 for testing, monitoring, simulation, etc. In still other implementations, secondary system may be a transceiver that is communicatively coupled (wired or wirelessly) to ground-based network 302 to transmit the data to a remote location coupled to network 302.

Figure 4:
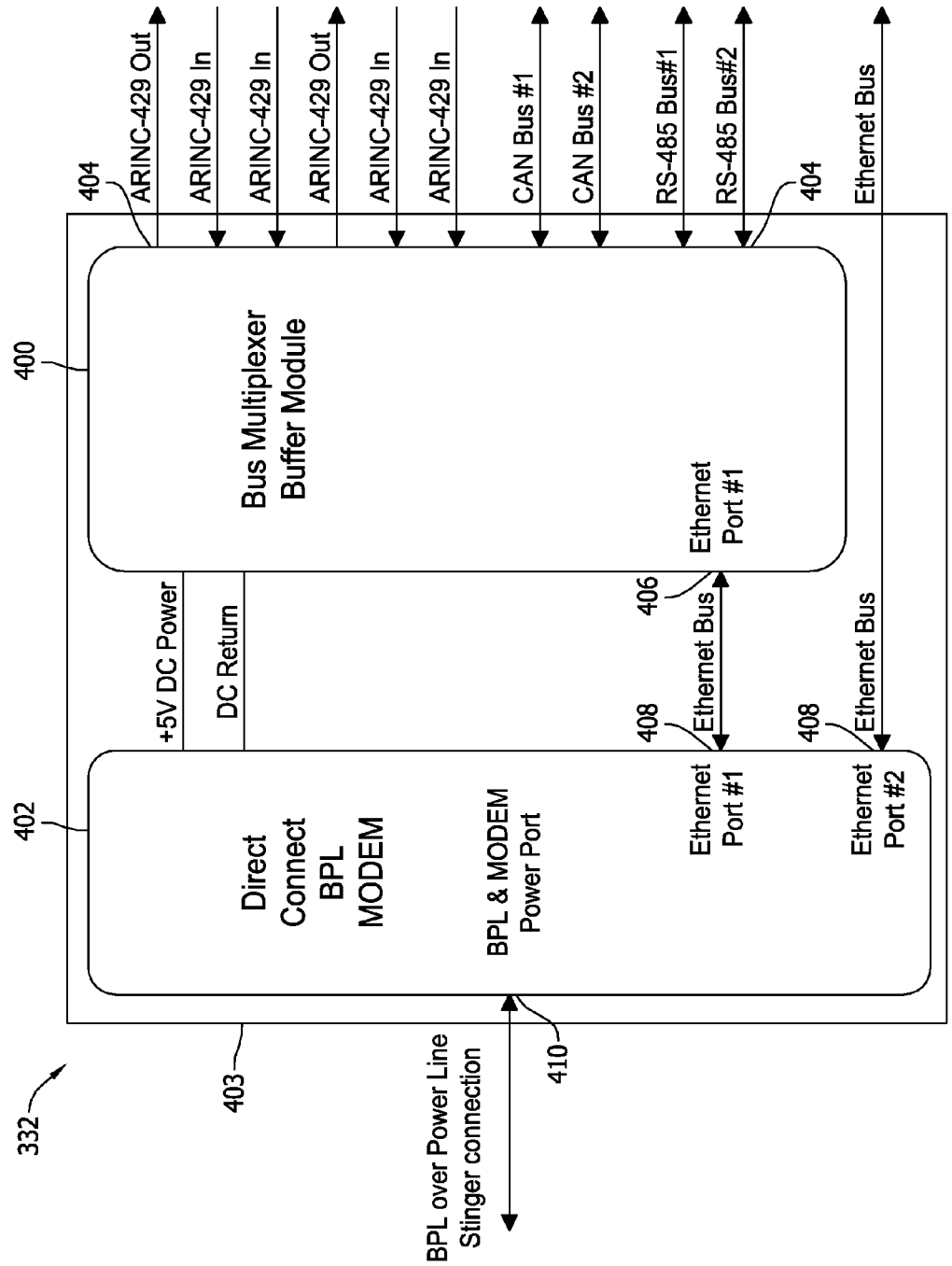
FIG. 4 is a diagram on an example implementation of an aircraft systems interface unit.

FIG. 4 is a diagram on an example implementation of aircraft systems interface units 332. Aircraft systems interface unit 332 includes a multiplexer 400 and a BPL modem 402. A housing 403 encloses the multiplexer 400 and the BPL modem 402. In one implementation, housing 403 is a two inch by four inch by one inch housing. In another implementation, housing 403 is a six inch by four inch by four inch housing. In still other implementations, housing 403 is any other suitable size, whether larger or smaller in one or more dimensions.

Multiplexer 400 includes a plurality of input/output (IO) ports 404. Each port 404 is configured to be coupled to an aircraft data bus. Each port 404 may be coupled to a different aircraft data bus, may be coupled to more than one data bus, and/or more than one port 404 may be coupled to a same data bus. Although the illustrated implementation shows several types of data buses to which aircraft systems interface unit 332 may be coupled, including ARINC-429, CAN, and RS-485 buses, aircraft systems interface unit 332 may, additionally or alternatively, be coupled to any other suitable data buses. Multiplexer 400 asynchronously multiplexes the data from ports 404 and outputs the multiplexed data through communication port 406. In the exemplary implementation, communication port 406 is an Ethernet port. Multiplexer 400 encodes the multiplexed data as Ethernet packets for output via Ethernet port. In other implementations, communication port 406 may be any other suitable type of communication port.

BPL modem 404 includes a communication port 408 coupled to communication port 406. In the exemplary implementation, communication port 409 is an Ethernet port. In other implementations, communication port 408 may be any other type of communication port operable for communication with multiplexer 400 via communication port 406. BPL modem 402 outputs the multiplexed data via IO port 410. More specifically, BPL modem 402 is configured to transmit the multiplexed data over a power line, such as cable 306, coupled to IO port 410. In the exemplary implementation, BPL modem is a HomePlug standard modem without an enabled zero crossing detector. In some implementations, a zero crossing detector is present, but disabled. In other implementations, BPL modem 402 does not include a zero crossing detector. The absence of a zero crossing detector facilitates operation of BPL modem 402 with 400 Hz, three phase power lines. Other implementations may include a zero crossing detector. In the exemplary implementation, BPL modem 404 includes a second communication port 408 for coupling directly to an Ethernet bus. Alternatively, second communication port 408 may be omitted and/or may be other than an Ethernet port.

Figure 5:
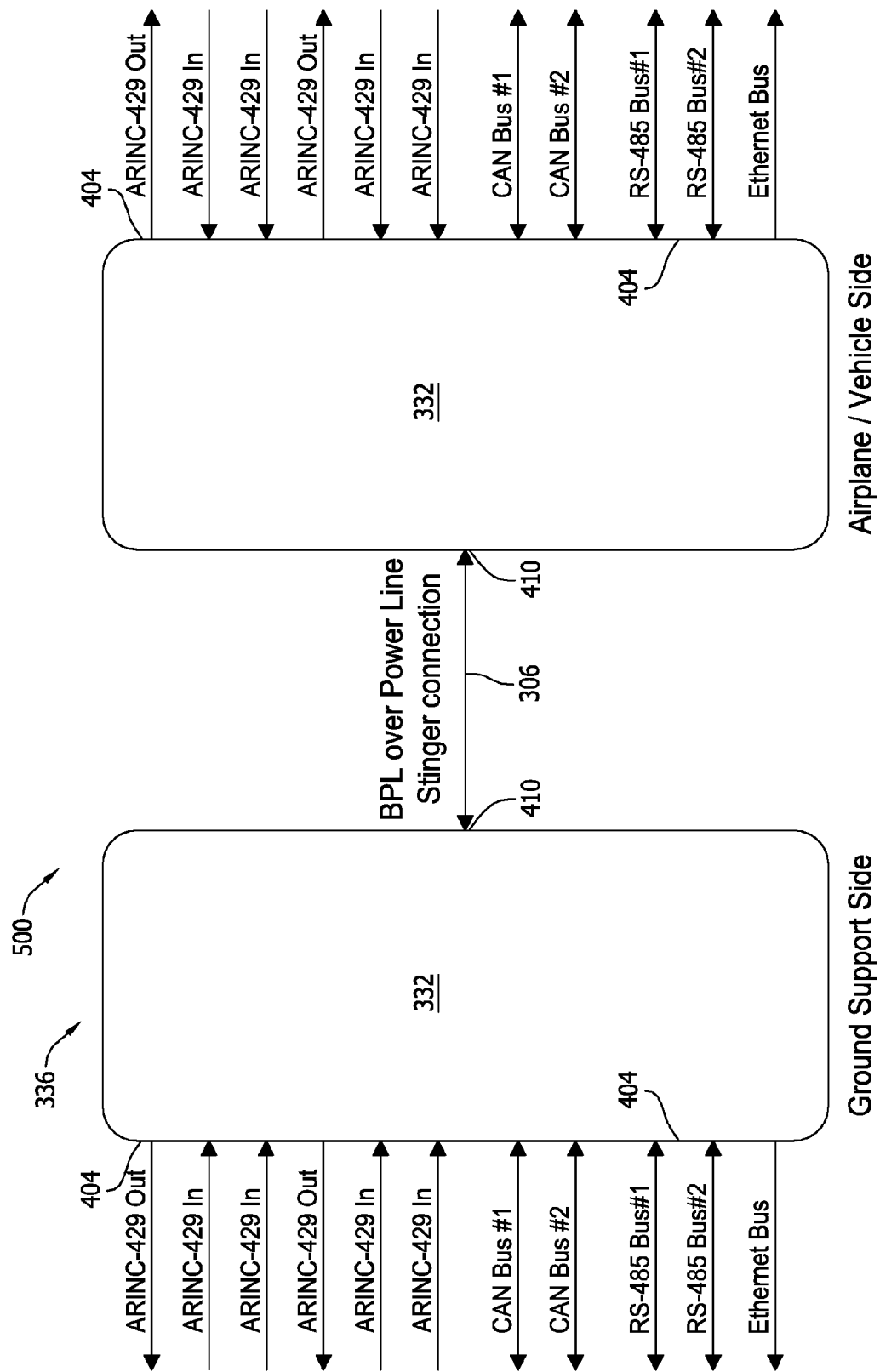
FIG. 5 is a diagram of an exemplary aircraft bus extension system.

FIG. 5 is a diagram of an aircraft bus extension system 500. The aircraft bus extension system 500 includes two aircraft systems interface units 332. More specifically, system 500 includes an aircraft side aircraft systems interface unit 332 (for installation in an aircraft, such as aircraft 102) and a ground side aircraft systems interface unit 332 (for installation in, for example, a ground unit 304) within ground side interface 336. Data from aircraft data buses is multiplexed by aircraft side aircraft systems interface unit 332 and transmitted over cable 306 to ground side aircraft systems interface unit 332. Ground side aircraft systems interface unit 332 decodes the Ethernet packets and demultiplexes the received data. Ground side aircraft systems interface unit 332 then outputs the demultiplexed data through IO ports 404 corresponding to the IO ports in aircraft side aircraft systems interface unit 332 through which the data was received. Thus, ground side aircraft systems interface unit 332 replicates the connections of aircraft side aircraft systems interface unit 332 to the aircraft data buses. Devices, such as FTU devices, coupled to ground side aircraft systems interface unit 332 receive the data as if the devices were directly connected to the data buses as the aircraft side aircraft systems interface unit 332 is connected. System 500 is thus operational as a data bus extension system.

Figure 6:
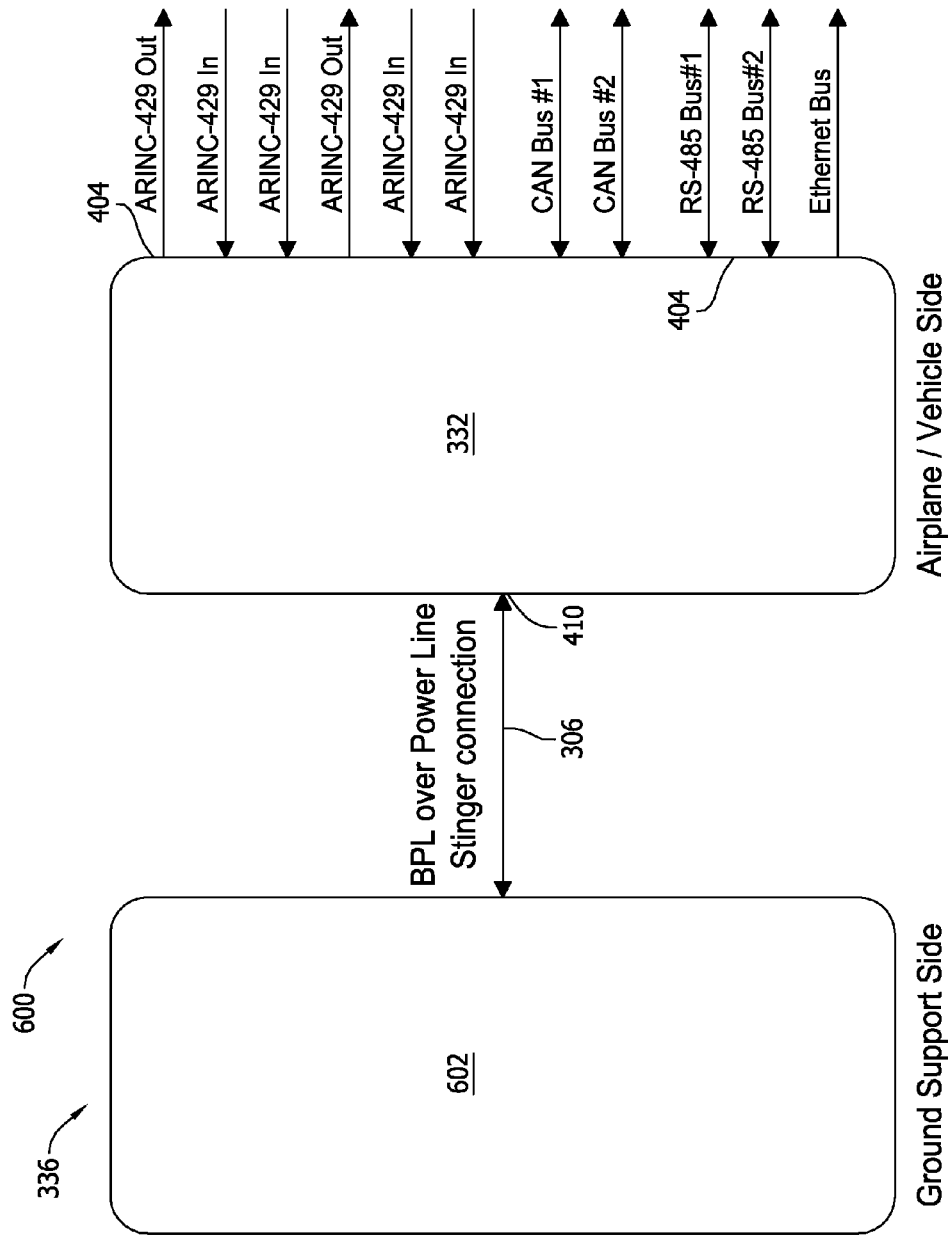
FIG. 6 is a diagram of another exemplary aircraft bus extension system.

FIG. 6 is a diagram of an aircraft bus extension system 600. The aircraft bus extension system 600 includes an aircraft side aircraft systems interface unit 332 for installation in an aircraft, such as aircraft 102, and a ground side interface 336. In this implementation, ground side interface 336 includes a computing device 602 configured to receive data via BPL. In the exemplary implementation, computing device 602 is a standalone computer. Alternatively, computing device may be a laptop computer, a computing interface, or any other suitable computing device. Data from aircraft data buses is multiplexed by aircraft systems interface unit 332 and transmitted over cable 306 to ground side interface 336. Computing device 602 extracts the transmitted data for use. The extracted data may be used by the computing device 602, or provided to another computing device or another system/device (not shown).

Figure 7:
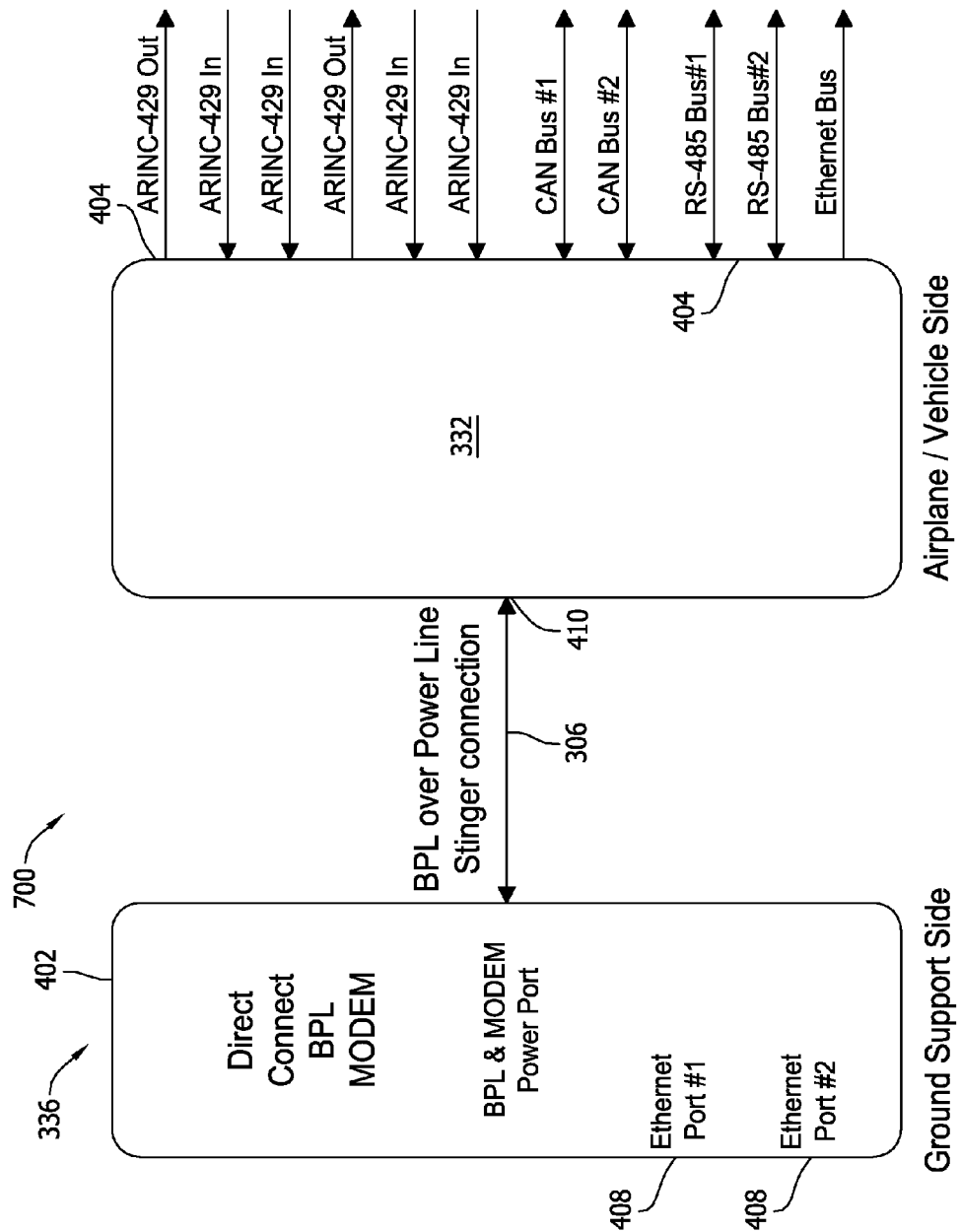
FIG. 7 is a diagram of another implementation of an aircraft bus extension system.

FIG. 7 is a diagram of another implementation of an aircraft bus extension system 700. The aircraft bus extension system 700 includes an aircraft side aircraft systems interface unit 332 for installation in an aircraft, such as aircraft 102, and a ground side interface 336. In this implementation, ground side interface 336 includes a BPL modem 402. Data from aircraft data buses is multiplexed by aircraft side aircraft systems interface unit 332 and transmitted over cable 306 to ground side interface 336. Ground side interface 336 receives the Ethernet packets transmitted over cable 306 and outputs the received data via one or both Ethernet ports 408. In the exemplary implementation, BPL modem 402 transmits the received data to secondary system 338. In other embodiments, BPL modem 402 transmits the data over network 302 to a remote computing device (not shown).

A technical effect of systems and methods described herein includes at least one of: (a) receiving data from a plurality of aircraft data buses; (b) multiplexing the received data; (c) encoding the multiplexed data into Ethernet packets; (d) transmitting the Ethernet packets over a power line; (e) receiving, at a second location connected to the power line, the Ethernet packets; and (f) extracting the multiplexed data from the Ethernet packets.

The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft systems interface unit comprising:
    a multiplexer comprising
        a plurality of inputs, each input configured for connection to at least one aircraft data bus;
        an output for outputting data received through the plurality of inputs;
    a broadband over power line (BPL) modem coupled to the output of the multiplexer, said BPL modem configured to transmit data received from the multiplexer over a power line.

2. The aircraft systems interface unit in accordance with claim 1, wherein said multiplexer comprises an asynchronous multiplexer.

3. The aircraft systems interface unit in accordance with claim 1, wherein said BPL modem comprises a HomePlug standard BPL modem.

4. The aircraft systems interface unit in accordance with claim 3, wherein the BPL modem does not include a zero crossing detector.

5. The aircraft systems interface unit in accordance with claim 3, wherein the BPL modem is configured to transmit data received from said multiplexer over four hundred hertz, three phase power lines.

6. The aircraft systems interface unit in accordance with claim 1, further comprising a housing enclosing said multiplexer and said BPL modem.

7. An aircraft bus extension system comprising:
    a first aircraft systems interface unit comprising:
        a multiplexer configured to receive data from a plurality of aircraft data buses through a plurality of interfaces and output the receive data through an output;
        a broadband over power line (BPL) modem coupled to the output of the multiplexer, said BPL modem configured to encode data received from said multiplexer to Ethernet packets and transmit the Ethernet packets over a power line; and
    a second aircraft systems interface unit comprising:
        a broadband over power line (BPL) modem configured to be coupled to a power line to receive Ethernet packets transmitted over the power line by said first aircraft systems interface unit, the BPL modem configured to decode received Ethernet packet to the format in which the data was received by said first aircraft systems interface unit and output the data.

8. The aircraft bus extension system in accordance with claim 7, wherein said second aircraft systems interface unit further comprises a multiplexer configured to receive the data from the BPL modem and output the data through a plurality of interfaces.

9. The aircraft bus extension system in accordance with claim 8, wherein the second aircraft systems interface unit is configured to output the data on the interface of the plurality of interfaces that corresponds to the interface of the first aircraft systems interface unit at which the data was received.

10. The aircraft bus extension system in accordance with claim 9, further comprising ground test equipment coupled to the second aircraft systems interface unit and configured to receive the data from the second aircraft systems interface unit through the plurality of interfaces.

11. The aircraft bus extension system in accordance with claim 10, wherein the ground test equipment comprises a mobile cart containing the ground test equipment.

12. The aircraft bus extension system in accordance with claim 7, further comprising a computing device coupled to the second aircraft systems interface unit and configured to receive the data from the second aircraft systems interface unit.

13. The aircraft bus extension system in accordance with claim 7, further comprising a power line coupled between the first and second aircraft systems interface units.

14. The aircraft bus extension system in accordance with claim 13, wherein said power line is configured to deliver power to an aircraft in which the first aircraft systems interface unit is installed.

15. The aircraft bus extension system in accordance with claim 7, wherein said first aircraft systems interface unit BPL modem and said second aircraft systems interface unit BPL modem are configured to transmit data over four hundred hertz, three phase power lines.

16. A method of extending an aircraft bus, said method comprising:
    receiving, at a first location, data from a plurality of aircraft data busses;
    multiplexing the received data;
    encoding the multiplexed data into Ethernet packets;
    transmitting the Ethernet packets over a power line;
    receiving, at a second location connected to the power line, the Ethernet packets; and
    decoding the multiplexed data from the Ethernet packets.

17. The method in accordance with claim 16, further comprising demultiplexing the multiplexed data.

18. The method in accordance with claim 17, further comprising delivering the demultiplexed data to ground test equipment.

19. The method in accordance with claim 16, wherein multiplexing the received data comprises asynchronously multiplexing the received data.

20. The method in accordance with claim 16, wherein transmitting the Ethernet packets over a power line comprises transmitting the Ethernet packets over a four hundred hertz, three phase power line.

* * * * *